(12) United States Patent
Kone et al.

(10) Patent No.: US 8,750,883 B2
(45) Date of Patent: Jun. 10, 2014

(54) COMMUNICATION NETWORK METHOD AND APPARATUS INCLUDING MACRO BASE STATION AND FEMTO BASE STATION

(75) Inventors: Mamadou Kone, Jhudong Township (TW); Ming-Hung Tao, Tainan (TW); Ying-Chuan Hsiao, Jhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 1090 days.

(21) Appl. No.: 12/565,886

(22) Filed: Sep. 24, 2009

(65) Prior Publication Data

US 2010/0120438 A1    May 13, 2010

Related U.S. Application Data

(60) Provisional application No. 61/113,774, filed on Nov. 12, 2008.

(51) Int. Cl.
*H04W 36/00* (2009.01)

(52) U.S. Cl.
USPC ............................................ 455/444; 370/352

(58) Field of Classification Search
USPC .......... 455/444, 446, 447; 370/252, 331, 335, 370/338
See application file for complete search history.

(56) References Cited

U.S. PATENT DOCUMENTS

| | | | |
|---|---|---|---|
| 2002/0137517 A1* | 9/2002 | Williams et al. | 455/444 |
| 2008/0316954 A1* | 12/2008 | Zheng | 370/315 |
| 2009/0316649 A1* | 12/2009 | Chen | 370/331 |
| 2010/0027431 A1* | 2/2010 | Morrison et al. | 370/252 |

* cited by examiner

*Primary Examiner* — Patrick Edouard
(74) *Attorney, Agent, or Firm* — Finnegan, Henderson, Farabow, Garrett & Dunner, LLP

(57) ABSTRACT

A communications network comprises a macro base station for providing service to a macrocell and a femto base station in a femtocell, wherein the femtocell overlies the macrocell, the femto base station is configured to perform self-configuration using resource profiles, and resource profiles include pre-configured profiles and frequency reuse information.

29 Claims, 7 Drawing Sheets

COMMUNICATION NETWORK METHOD AND APPARATUS INCLUDING MACRO BASE STATION AND FEMTO BASE STATION

This application claims the benefit of priority from U.S. Provisional Application No. 61/113,774, filed on Nov. 12, 2008, the disclosure of which is expressly incorporated herein by reference to its entirety.

TECHNICAL FIELD

The invention relates to operation of a wireless network. More particularly, this invention relates to a method and apparatus for operating a network including a macro base station and a femto base station.

DESCRIPTION OF RELATED ART

Cellular telephone systems have existed for decades. Previously existing systems use cellular "towers," also known as base stations, which are owned and operated by large cellular telephone companies. These towers provide coverage over large areas of a communication network, or "macro network." The area of coverage of such a tower is sometimes referred to as a "macrocell." These towers are positioned to bring the greatest coverage to the greatest number of cellular phone users being service by the macro network.

A femto base station, originally known as an access point base station, is a small version of a cellular phone tower. The area of coverage of a femto base station is referred to as a "femtocell." Localized femtocells may be established within and overlying macrocells to handle areas with relatively dense concentrations of mobile users, and are typically designed and located for use in residential or small business environments. A femtocell currently enables 2 to 8 mobile phones to connect to the service provider's network via broadband, such as DSL or cable, and allows the service provider to extend service coverage indoors, especially where access to the macro network would otherwise be limited or unavailable. When used in dense deployments, femtocells have the potential of delivering an order of magnitude more capacity than the macrocell alone.

Femtocells may belong to either a Closed Subscriber Group (CSG) or an Open Subscriber Group (OSG), both of which operate in accordance with guidelines set forth in the IEEE 802.16m standard. A CSG femto base station is accessible only to a set of pre-defined or authorized user stations, which typically consist of registered user stations of subscribers to the CSG. In emergency situations, however, a CGS may allow non-registered user stations to access the femto base station. Unlike a CSG, the base station of an OSG is accessible to any user station.

For the decades that cellular phones have existed, femtocells were unavailable to individual consumers. Consequently, the recent introduction of femtocells to the general public has created and revealed new, previously unknown, and unaddressed problems. One problem that may be caused by the arbitrary deployment of femtocells in an existing network is the interference that may result both between femtocells and macrocells and amongst different femtocells. Because femtocells require no network planning, operators often do not know where, if any, individual femtocells will be deployed and cannot reconfigure their macro network in order to account for the individual femtocells. Consequently, interference often results from the lack of unique spectrums for femtocell networks and inadequate spectrum planning in the wider network.

For example, a network operator might license a single frequency in the frequency band of 1800 MHz to deploy a macrocell and multiple femtocells. Because femtocells only work in the frequencies licensed to the network that they are in, the same frequency is utilized by the macrocell and femtocells. Consequently, a macrocell user near a femtocell may experience interference from the femto base station. Although interference may be resolved with a handover of the user from the macrocell to the femtocell, handover is not an option when the femtocell belongs to a CSG, where the service is limited to a number of registered users. Consequently, in networks with CSGs, transmissions between a macro user unit and its macro base station may suffer from a near-far problem in which a signal received by the user from a nearby femto base station is stronger than, and may mask, a signal received from the macro base station located further away. For example, a user unit that is located closer to transmitter A than it is from transmitter B receives more power from the nearby transmitter A when both transmitters A and B transmit signals simultaneously at equal powers. The user unit in this case may treat signals from transmitter B as noise, and signals from transmitter B may become difficult, if not impossible, to be understood. In order to compensate for the near-far problem, a user unit may increase its transmit power with its serving base station while it is within the coverage area of another base station. The resultant high power transmission creates interference because of its shared frequency with other transmissions.

The near-far problem may also occur amongst femtocells. For example, in high-rise accommodations where femto base stations may be located within close proximity to each other and may overlap, femto users on different floors can create interference amongst each other. Additionally, densely deployed femtocells in these situations also suffer from the hidden terminal problem, in which the presence of a femto base station is unknown to adjacent femto base stations and may cause unexpected interference with those femto base stations' transmissions.

Accordingly, there is a need for spectrum planning in the network to mitigate interference both between femtocells and macrocells and among different femtocells.

SUMMARY

In accordance with a first aspect of the present disclosure, a communications network is provided. The network comprises a macro base station for providing service to a macrocell; and a femto base station in a femtocell, wherein the femtocell overlies the macrocell, the femto base station is configured to perform self-configuration using resource profiles, and resource profiles include pre-configured profiles and frequency reuse information.

In accordance with a second aspect of the present disclosure, there is provided a method for communicating within a communications network. The method comprises providing service to a macrocell from a macro base station; receiving service in a femtocell including a femto base station; and performing self-configuration in the femto base station using resource profiles, wherein the femtocell overlies the macrocell, and resource profiles include pre-configured profiles and frequency reuse information.

It is to be understood that both the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this specification, illustrate various embodiments. In the drawings.

DESCRIPTION OF THE EMBODIMENTS

In the following description, for purposes of explanation and not limitation, specific techniques and embodiments are set forth, such as particular sequences of steps, interfaces, and configurations, in order to provide a thorough understanding of the techniques presented herein. While the techniques and embodiments will primarily be described in context with the accompanying drawings, those skilled in the art will further appreciate that the techniques and embodiments can also be practiced in other communication systems.

Reference will now be made in detail to exemplary embodiments, examples of which are illustrated in the accompanying drawings. Wherever possible, the same reference numbers will be used throughout the drawings to refer to the same or like parts.

Methods, apparatus, and systems disclosed herein are configured to provide self-configuring femtocells.

Figure 1:
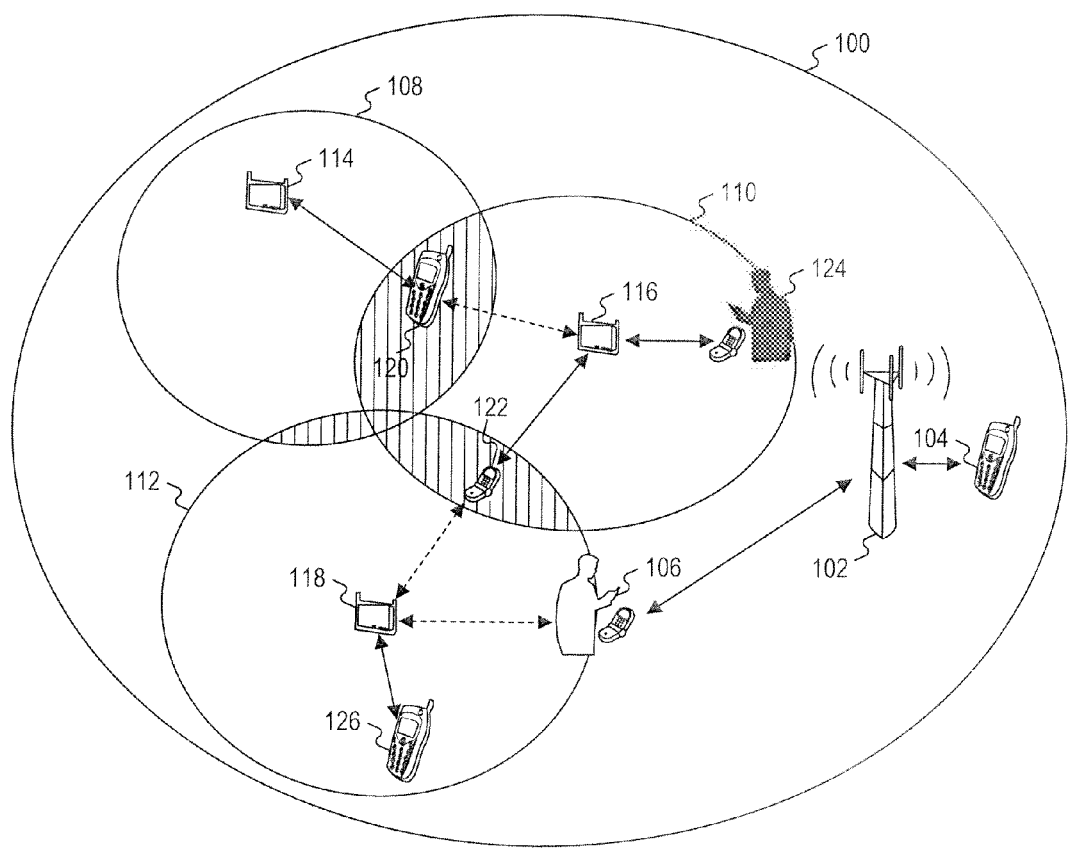
FIG. 1 shows an exemplary macrocell.

FIG. 1 shows an exemplary macrocell 100 in a wireless macro network. Macrocell 100 includes a macro base station (MBS) 102 which provides service to user stations 104 and 106. The user stations can be mobile stations such as mobile telephones ("cellular" telephones) or mobile computer stations including, for example, portable, pocket, hand-held, computer-included, or car-mounted mobile stations which communicate voice and/or data in a radio access network.

Femtocells 108, 110, and 112 are deployed near MBS 102 and overlie macrocell 100. Femtocells 108, 110, and 112 respectively contain femto base stations (FBSs) 114, 116, and 118. MBS 102 and FBSs 114, 116, and 118 are generally fixed stations that communicate with the user stations and may also be referred to as, for example, a node, an access point, etc. FBS (femto base station) 114 services a user station 120, FBS 116 services user stations 122 and 124, and FBS 118 services a user station 126.

Hereafter, a "macro user station" refers to a user station serviced by a macro base station, and a "femto user station" refers to a user station serviced by a femto base station. Therefore, user stations 104 and 106 are macro user stations, and user stations 120, 122, 124, and 126 are femto user stations.

Because of the proximity of FBSs 114, 116, and 118 to each other, areas of their communication coverage overlap when they transmit on the same frequency. These areas of overlapping femtocells 108, 110, and 112, or interference zones, are shown in FIG. 1 as cross-hatched areas between FBSs 114, 116, and 118. User stations located within these interference zones, such as femto user stations 120 and 122, may experience interference from nearby base stations to which they are not a subscriber when receiving information on the same frequency. For example, the communication of femto user station 120 with FBS 114, shown as a solid line, may experience interference from nearby FBS 116, shown as a dotted line. As another example, the communication of femto user station 122 with FBS 116, shown as a solid line, may experience interference from nearby FBS 118, shown as a dotted line.

Moreover, because femtocells 108, 110, and 112 overlie macrocell 100, macro user stations served by MBS 102 may experience interference from nearby femtocells. For example, macro user station 106, served by MBS 102 and located in the vicinity of FBS 118, may experience interference from FBS 118 while communicating with MBS 102.

Figure 2:
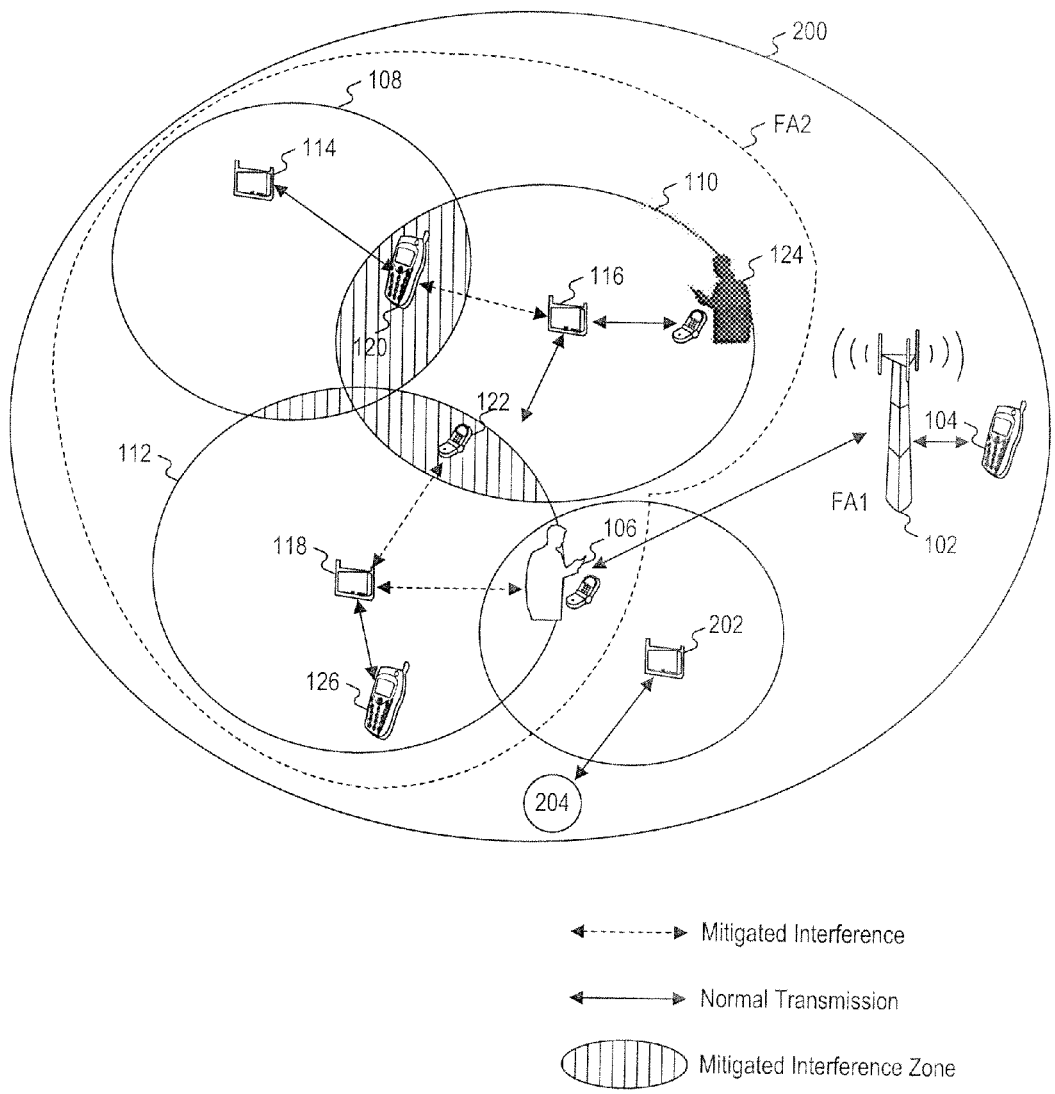
FIG. 2 shows an exemplary macrocell with mitigated interference.

FIG. 2 shows an exemplary macrocell 200 in accordance with one embodiment consistent with the invention. The physical layout of macrocell 200 is substantially similar to macrocell 100 shown in FIG. 1, and includes MBS 102, femtocells 108, 110, and 112, FBSs 114, 116, and 118, and user stations 104, 106, 120, 122, 124, and 126. However, in FIG. 2, the effects of the interference zones between femtocells 108, 110, and 112 are mitigated as a result of utilizing frequency reuse and pre-configured profiles, as explained more fully below.

Consistent with current typical practice, it is assumed for purposes of explanation herein, that each FBS only supports at most 8 user stations. As a result, each FBS does not require a large frequency band in order to operate effectively. Consequently, each FBS does not need to occupy an entire frequency band for its operation. In frequency reuse, a frequency is re-used in a different area, or "reuse region," for a different transmission. A frequency reuse factor n is the rate at which the same frequency can be used in a network. For example, if the reuse factor in macrocell 200 is 3, then the same frequency may be used by every third femtocell. If the total bandwidth available to macrocell 200 is B, then based on frequency reuse n, each femtocell can utilize a number of frequency channels corresponding to a bandwidth of B divided by n, i.e., B/n. That is, a bandwidth of B/n is available in any given femtocell.

A pre-configured profile, on the other hand, includes a specific set of downlink/uplink (DL/UL) subframes in a superframe, i.e., divisions in the superframe in the time domain, that is unique from all other profiles within the same superframe. When a FBS uses a particular profile, it communicates with its user stations using only those DL/UL subframes assigned to the profile. By using different profiles, adjacent FBSs may share a single frequency allocation or frequency reuse region without experiencing interference. In accordance with one embodiment of the disclosure, the number of pre-configured profiles available to a FBS is adaptive to the number of femtocells in an area. For example, a provider may increase the number of profiles available in a reuse region when the number of femtocells in that region increases.

Information on frequency reuse regions and pre-configured profiles can be used in resource profiles. In addition to resource profiles, a provider of the network may propose different frequency allocations based on the density of the macrocell. Accordingly, a macrocell, such as macrocell 200, may contain different frequency allocations each containing a plurality of frequency reuse regions. Moreover, each reuse region may contain a plurality of pre-configured profiles.

When only one frequency allocation is available to a macrocell, the number of possible FBSs that can be deployed in the macrocell without incurring interference is equal to the number of available pre-configured profiles in that frequency allocation. If there are k frequency reuse regions in a macrocell and j pre-configured profiles for each reuse region proposed by a MBS, the number of total available resource profiles is $$(k-1)*j.$$

In this expression, one region is subtracted from the total regions k because the MBS in the macrocell reserves a reuse region for its own use.

When numerous frequency allocations are available to a macrocell, the number of possible FBSs that can be deployed in the macrocell without incurring interference depends on the number of available resource profiles in the macrocell as well as the number of frequency allocations available to the macrocell. If the number of frequency allocations available to a macrocell is a, and a MBS sets the total number of resource profiles within each frequency allocation to be b, then the number of FBSs that can be deployed adjacent to each other in the macrocell without incurring interference is $$(a-1)*b.$$

The number b of resource profiles, in that case, is proportional to the number of reuse regions k and the number of pre-configured profiles j within each reuse region, i.e., b=k*j.

Information on frequency allocations and resource profiles are broadcasted from the MBS to the FBSs in the header of a superframe (superframe header). When frequency reuse n is utilized in the macrocell, each subframe of the superframe sent by the MBS is divided into n segments in order to accommodate a reuse-n region, i.e., a frequency reuse region utilizing one of the n segments of a frequency allocation. The subframe that is divided into n segments may also accommodate a reuse-1 region, i.e., a frequency reuse region utilizing all n of the n segments of a frequency allocation. Accordingly, the whole frequency band of the subframe, including all n segments, is utilized for a reuse-1 region, and each segment is used for a reuse-n region. For example, if frequency reuse 3 (i.e., n=3) is utilized in macrocell 100, MBS 102 may choose to allocate a reuse-1 region, including the whole frequency band of the subframe including all 3 segments, to macro user station 104 located closer to its center, and a reuse-3 region, including only one of the three segments in the frequency allocation, to macro user station 106 which is far from its center and located in a cell edge area. By using reuse-3, macro user station 106 may avoid interference from an adjacent macrocell that uses the same frequency allocation.

In FIG. 2, three frequency allocations, FA1, FA2, and FA3, are available to macrocell 200. The number of frequency allocations is determined by the provider based on the provider capacity, and is not limited to 3. MBS 102 reserves FA1 for its own use and allocates FA2 and FA3 to the femtocells within the macrocell. FA2 is shared by femtocells 108, 110, and 112, and FA3 is currently not being used. In exemplary macrocell 200, frequency reuse 3 is utilized, i.e., n=3, although n may be any number other than 3. In frequency reuse 3, each frequency allocation is further divided into three segments, each containing different profiles. Femtocells 114, 116, and 118 may therefore use any one of available profiles within any one of the three reuse regions in FA2.

Either the MBS or the FBSs contains several synchronization channels (hereafter referred to as the Advanced Preamble, or "A-Preamble") within the superframe. The A-Preamble is a downlink-only control channel which provides references for timing, frequency and frame synchronization, RSSI estimation, and channel estimation. The A-Preamble may be sent per frame in the superframe, and contains data used for fine synchronization, as well as specific cell and/or sector identifications useful for FBS deployment.

Figure 3:
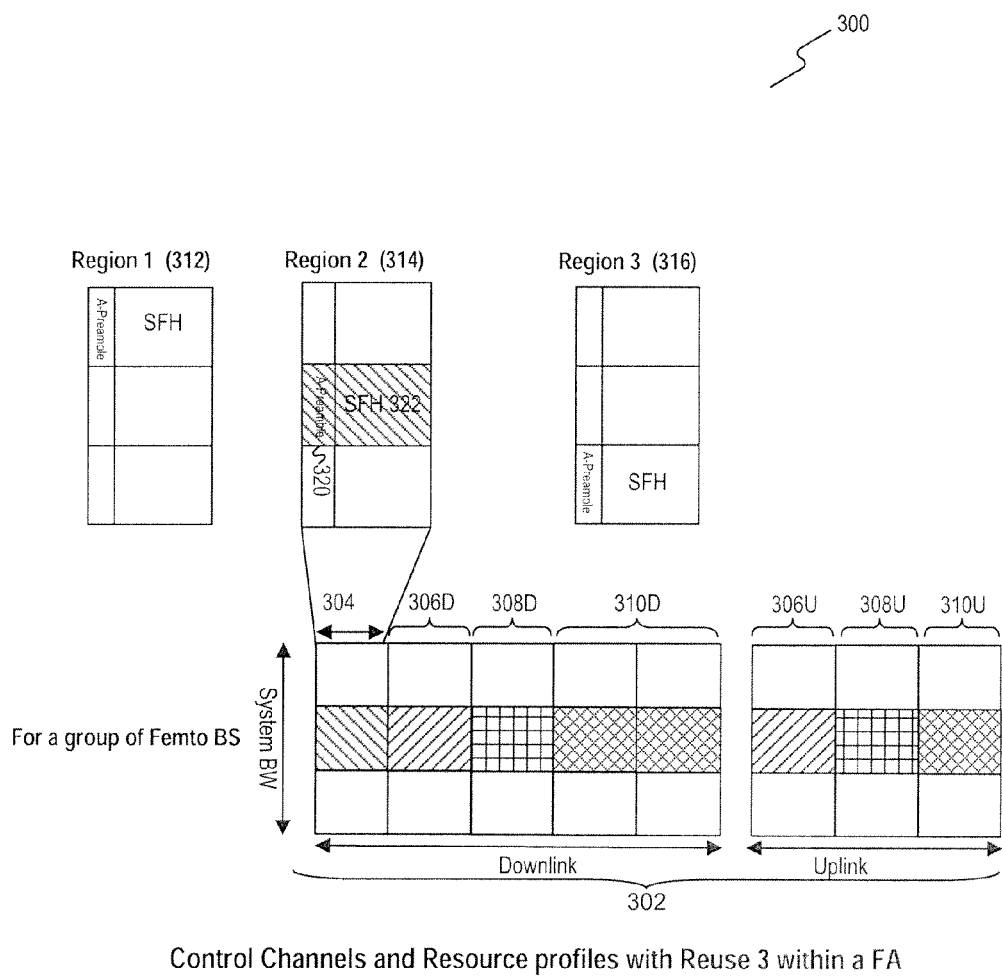
FIG. 3 shows an exemplary schematic diagram of a superframe.

FIG. 3 shows an exemplary schematic diagram 300 of a superframe 302 that is broadcasted from MBS 102 to FBSs 114, 116, and 118. Diagram 300 shows various control channels and resource profiles within a single frequency allocation, i.e., FA2. Superframe 302 contains multiple subframes including a first subframe 304, followed by different downlink and uplink subframes 306D, 308D, 310D, 306U, 308U, and 310U. 306D and 306U respectively represent the downlink and uplink portions of a first profile, 308D and 308U respectively represent the downlink and uplink portions of a second profile, and 310D and 310U respectively represent the downlink and uplink portions of a third profile. FIG. 3 shows superframe 302 with three reuse regions (i.e., n=3). The shaded area in the region 2 (314) corresponds to the region in the first subframe 304 of superframe 302 and contains the control channels related to the use of different resource profiles to be used by femto base stations. A larger view of the first subframe 304 is provided in 314. As shown in 314, first subframe 304 includes an A-Preamble 320 which is unique to each reuse region, and a Super Frame Header (SFH) 322 which is also unique to each reuse region.

The SFH, located in the first subframe within a superframe, carries essential system parameters and system configuration information. The SFH is divided into two parts: the Primary Super Frame Header (P-SFH) and the Secondary Super Frame Header (S-SFH). The P-SFH, having a fixed size, is transmitted with every superframe. S-SFH, when present, may be transmitted over one or more superframes. The size of the S-SFH is variable, and is indicated in the P-SFH. In one embodiment, the P-SFH and S-SFH together may occupy at most 5 MHz of bandwidth. The SFH may be time-division multiplexed with the A-PREAMBLE, and may be frequency-division multiplexed with data within the same subframe. Also, the P-SFH may be frequency-division multiplexed with the S-SFH within the first subframe. As 314 shows, SFH 322 is transmitted at the same frequency as A-Preamble 320. Similarly, when region 1 or region 3 is selected for use, the respective SFH of those regions are transmitted at the same frequency as the A-Preamble specific to those regions. Subframe 312 and 316 respectively show the first subframes of superframe 302 when region 1 and region 3 are selected for use.

Other means (not shown) of subframe division may be used. For example, the UL subframes may be divided in a Frequency Division Multiplexing (FDM) manner in order to provide more resource profiles within a specific bandwidth.

Figure 4:
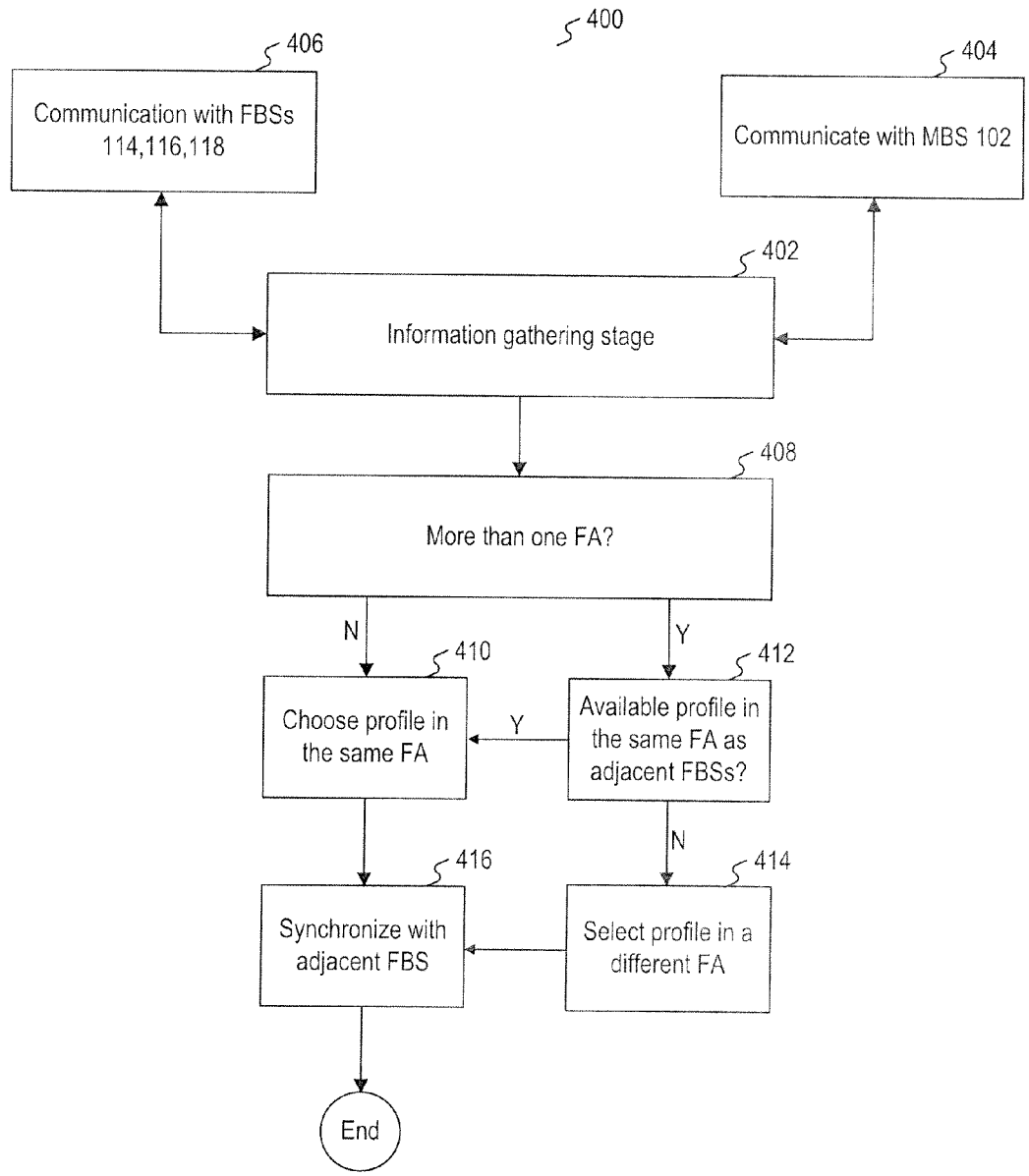
FIG. 4 shows an exemplary process of a femto base station.

Referring again to FIG. 2, a new FBS 202 is assumed to be deployed in macrocell 200, servicing a macro user station 204, and operating adjacent to FBSs 114, FBS 116, and FBS 118. In order to establish a service that creates minimum interference with macrocell 200, as well as adjacent femtocells 108, 110, and 112, FBS 202 engages in a process of self-configuration. FIG. 4 shows an exemplary process 400 of the self-coordination of FBS 202.

With reference to FIG. 4, in an information gathering stage (402), FBS 202 actively scans for and acquires information from MBS 102 (404) through an A-Preamble process in order to perform network synchronization. In doing so, FBS 202 first performs initial acquisition through a P-SFH. Then, FBS 202 obtains the SFH from the A-Preamble. Because the availability of resource profiles may be included in the SFH for each region, FBS 202 may decode common control information, i.e., information common to FBSs 114, 116, and 118, from the SFH in order to identify the resource profiles that are available. Additionally, in 402, FBS 202 scans adjacent FBSs 114, 116, and 118 (406) to receive their system information and their selected resource profiles.

In step 408, FBS 202 identifies, from the resource profiles that it obtains from MBS 102, whether one or more frequency allocations are available in macrocell 200. If FBS 202 determines that only one frequency allocation is available, it proceeds to 410. If it determines that more than one frequency allocation is available, it proceeds to 412. In a Closed Subscriber Group (CSG), the provider often only has one frequency allocation for the macrocell and femtocells.

If only one frequency allocation is available to macrocell 200, then FBS 202 will choose, in 410, a resource profile in the one frequency allocation. Based on information that FBS 202 receives from MBS 102 and FBSs 114, 116, and 118, FBS 202 selects an available resource profile that does not interfere, or provides the least interference, with its adjacent femtocells.

In 412, more than one frequency allocation is available to macrocell 200. In this case, FBS 202 first determines whether the frequency allocation currently used by adjacent FBSs 114, 116, and 118, i.e., FA2, contains any available resource profiles. If available resource profiles exist within the same frequency allocation, and information from adjacent FBSs allows FBS 202 to use the same frequency allocation, then FBS 202 selects an available resource profile within the same frequency allocation.

If, however, no available resource profiles exist within the same frequency allocation, then FBS 202 selects an available resource profile in another frequency allocation that is available to macrocell 200 (414). This may occur when the number of femtocells in a region exceeds the total number of resource profiles (reuse region and pre-configured profiles) available in a frequency allocation, as may be the case in densely populated areas. Depending on the provider's bandwidth allocations, different reuse regions may have different numbers of pre-configured profiles, resulting in differing numbers of resource profiles. When using the second frequency allocation FA2, FBS 202 may select a resource profile that may or may not be the same resource profile used by FBSs 114, 116, or 118. In macrocell 200, FBS 202 determines that no resource profile is available within FA2, and thus selects a resource profile available in FA3.

Next, in 416, FBS 202 synchronizes with adjacent FBSs, if any, that are using the same frequency allocation. Because FBSs in the same region operate on the same frequency channels, synchronization of control information may be used minimize interference of control channels. For example, every region receives its SFH on the same frequency channels. Therefore, a newly deployed FBS should be synchronized in its DL transmission with adjacent FBSs in the same reuse region. Once all FBSs using the same frequency allocation are synchronized, user stations serviced by those FBSs would be able to acquire the A-Preamble from their respective FBSs without experiencing interference.

Base stations transmit the resource allocation information to their respective user stations only in the reuse regions assigned to the user stations. For example, in FIG. 2, if macro user station 104 is assigned a reuse-1 region and macro user station 106 is assigned a reuse-3 region, then MBS 102 may only transmit the resource allocation information to macro user station 104 in the reuse-1 region, and transmit the resource allocation information to macro user station 106 in the reuse-3 region. Because FBSs 114, 116, and 118 each utilize reuse-3, they transmit the resource allocation information to their respective user station(s) only in a reuse-3 region, and in accordance with their selected resource profiles.

When multiple frequency allocations are available, no interference occurs between the control channels of MBS 102 and the group of FBSs (114, 116, and 118) during transmission because they use different frequency allocations. The only possible control channel interference occurs within a group of femtocells using the same reuse region within a single frequency allocation. However, any interference occurring within those femtocells is greatly reduced, if not eliminated, by the orthogonality used in A-Preamble transmission. Indexation, or the insertion of certain information specific to a user in the SFH, may also be used to transmit information specific to a FBS's user profile to an AMS (Advanced Mobile Station) within a reuse region while minimizing interference.

Once a FBS performs self-coordination in a macrocell, it performs synchronization with its femto user station and the femto user station decodes the SFH broadcasted by the FBS in order to acquire the resource profile and frequency allocation of the FBS. In this synchronization, the user (AMS) scans the frequency band and acquires the A-Preamble to synchronize the time, frequency, and frame, with other information needed to maintain the user's connection with the FBS. When the AMS is in operation, it may periodically report its state to its serving FBS. These reports include any detected interference from nearby, and possibly hidden, FBSs. The serving FBS evaluates these reports and may adapt its configuration based on information provided in the reports in order to avoid interference. The choices for adapting configuration, allowed through a combination of frequency reuse and subframe profiles reservations, increases the ability of the serving FBS to adapt its configurations to mitigate interference in an area with dense femtocells.

Unlike a femto user station, a macro user station may utilize a reuse-1 region by default, and may be assigned a resource profile only when it encounters interference from a femtocell. When the macro user station encounters no interference, it utilizes the full frequency band of the frequency allocation. Similarly to a femto user station, a macro user station sends reports to its serving MBS when it encounters interference. This may happen when, for example, the SFH of a macro user station is masked by a strong interfering signal from a nearby FBS. The serving MBS uses these reports, as well as the bandwidth needs of the macrocell, to select and assign a resource profile to the user station in order to avoid interference. Alternatively, the interference may trigger the macro user station to attempt a hand-over. A hand-over to a second base station is possible when the second base station is an OSG, or in the case of a CSG, hand-over is possible when the second base station belongs to the same provider or if the CGS grants permissions for the hand-over.

Figure 5:
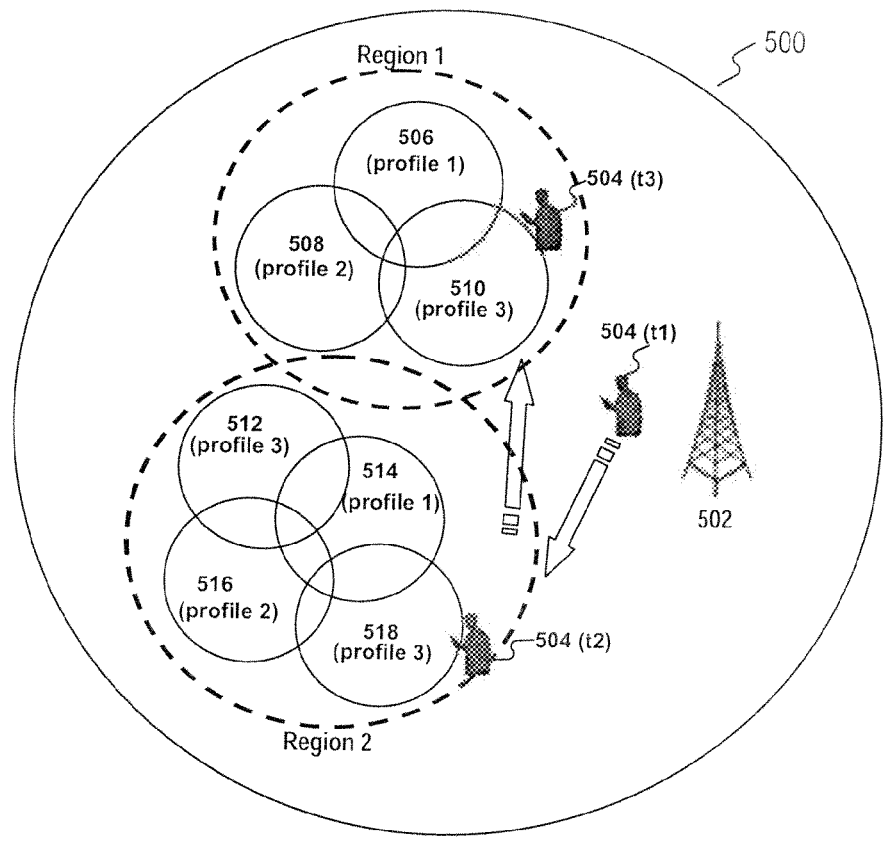
FIG. 5 shows an exemplary macrocell with a single frequency allocation.

When only one frequency allocation is available to the macrocell, a bottleneck may occur when a femtocell interferes with a user station served by an MBS due to the limited numbers of resource profiles available to the macrocell and femtocells. In this case, the MBS engages in an adaptive resource profile assignment procedure. FIG. 5 shows an example of the adaptive resource profile assignment by an MBS to its user station.

In FIG. 5, it is assumed that only one frequency allocation is available in macrocell 500. Macrocell 500 includes an MBS 502 serving a macro user station 504, and femtocells 506, 508, 510, 512, 514, 516, and 518. Femtocells 506, 508, and 510 respectively use profile numbers 1, 2, and 3 within a first reuse region (region 1), and femtocells 512, 514, 516, and 518 respectively use profile numbers 3, 1, 2, and 3 within a second reuse region (region 2). Femtocells 512 and 518 are spaced far enough apart so that their use of the same profile (profile 3) within the same reuse region (region 2) does not cause interference to each other.

At time t1, macro user station 504 is located near MBS 502 and does not experience any interference from nearby femtocells. At this time, MBS 502 may allocate the full frequency band to macro user station 504, utilizing reuse 1, in order to satisfy its bandwidth need.

At time t2, macro user station 504 has relocated to an area in the vicinity of femtocell 518 which uses the second reuse region (region 2). At time t2, macro user station 504 experiences some interference from femtocell 518. Macro user station 504 reports this interference to MBS 502 if possible, and MBS 502 adaptively assigns, to macro user station 504, any resource profile that does not interfere with the resource profile of femtocell 518. If macro user station 504 is located far enough from region 1, MBS 502 may assign all profiles of the first reuse region for use by macro user station 504. For example, MBS 502 may assign profile 1 within region 1 to macro user station 504 to reduce or eliminate the interference. If macro user station 504 receives strong interference but cannot report such interference to MBS 502, the interfering FBS may monitor the DL/UL signal associated with its users to detect any macro user stations in its vicinity and inform MBS 502 to facilitate a handover of the macro user station through a backhaul, if possible. In a telecommunication system, a backhaul refers to a portion of the network which comprises intermediate links between the core of the network and smaller sub-networks. if handover is not possible, MBS 502 may select another resource profile for the macro user station. Handover may not be possible when the femtocell has reached its user capacity.

Whenever macro user station 504 relocates to a new area, the process described may be repeated. For example, at time t3, macro user station 504 relocates to the vicinity of femtocell 510 which uses the first reuse region (region 1). At time t3, macro user station 504 experiences interference from femtocell 510. Upon receiving macro user station 504's interference report, MBS 502 may assign any profile within region 2 to macro user station 504 to reduce or eliminate the interference.

Figure 6:
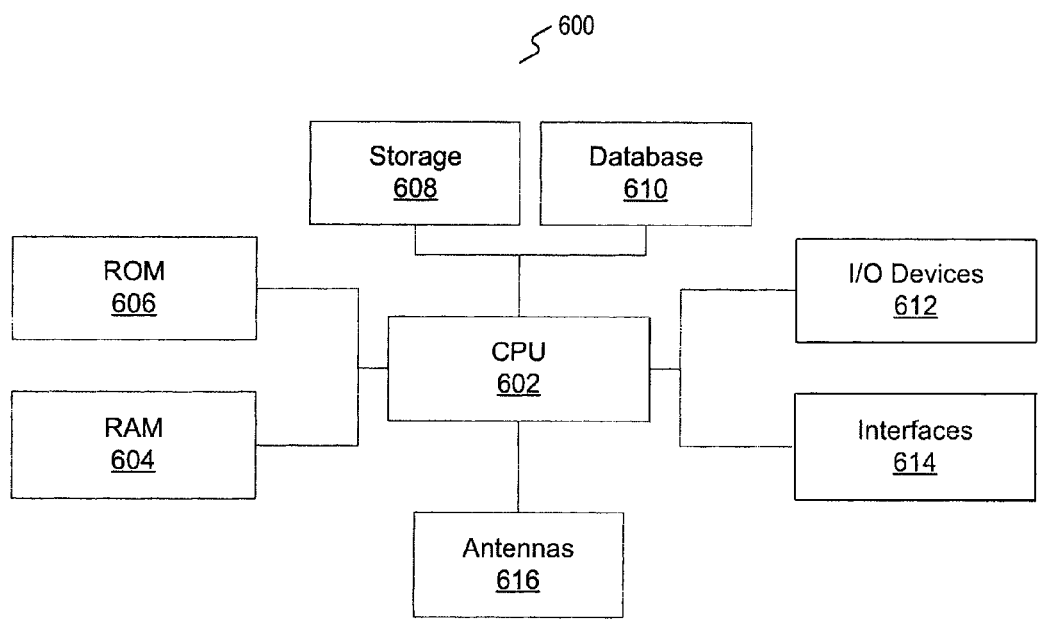
FIG. 6 shows an exemplary base station.

FIG. 6 illustrates a block diagram of an exemplary base station 600, according to an exemplary embodiment. For example, base station 600 may be MBS 102 or any of FBSs 114, 116, or 118 (FIG. 2). In FIG. 6, base station 600 may include one or more of the following components: at least one central processing unit (CPU) 602 configured to execute computer program instructions to perform various processes and methods, random access memory (RAM) 604 and read only memory (ROM) 606 configured to access and store information and computer program instructions, storage 608 to store data and information, databases 610 to store tables, lists, or other data structures, I/O devices 612, interfaces 614, antennas 616, etc. Each of these components is well-known in the art and will not be discussed further.

Figure 7:
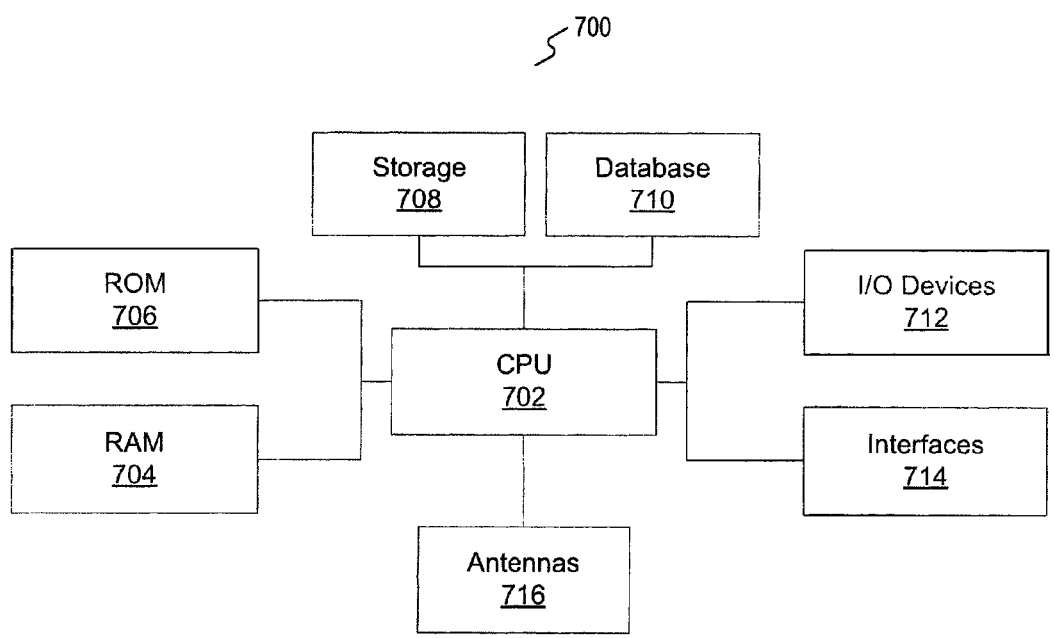
FIG. 7 shows an exemplary user station.

FIG. 7 illustrates a block diagram of an exemplary user station 700, according to an exemplary embodiment. For example, the user station 700 may be any of macro or femto user stations 104, 106, 120, 122, 124, or 126 (FIG. 2). In FIG. 7, user station 700 may include one or more of the following components: at least one central processing unit (CPU) 702 configured to execute computer program instructions to perform various processes and methods, random access memory (RAM) 704 and read only memory (ROM) 706 configured to access and store information and computer program instructions, storage 708 to store data and information, databases 710 to store tables, lists, or other data structures, I/O devices 712, interfaces 714, antennas 716 etc. Each of these components is well-known in the art and will not be discussed further.

Other embodiments of the invention will be apparent to those skilled in the art from consideration of the specification and practice of the invention disclosed here. For example, embodiments of the invention may include a single femtocell overlying a macrocell which performs self-configuration. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A communications network, comprising:
   a macro base station for providing service to a macrocell; and
   a femto base station in a femtocell,
   wherein:
   the femtocell overlies the macrocell,
   the femto base station is configured to perform self-configuration using resource profiles,
   the resource profiles are broadcasted from the macro base station in a super frame header, the resource profiles indicate sets of downlink and uplink subframes, and the resource profiles include pre-configured profiles and frequency reuse information.

2. The network of claim 1, wherein the resource profiles are obtained from the macro base station through a backhaul.

3. The network of claim 1, wherein the femtocell is a first femtocell and the femto base station is a first femto base station, the network further comprising:
   a second femto base station in a second femtocell,
   wherein during self-configuration, the first femto base station receives information from the macro base station and the second femto base station and selects a resource profile such that its interference with both the macro base station and the second femto base station is reduced.

4. The network of claim 3, wherein the second femto base station uses a second frequency allocation, and wherein during self-configuration:
   when the second frequency allocation is the only frequency allocation available to the macrocell, the first femto base station selects a resource profile that is available in the second frequency allocation, and
   when more than one frequency allocation is available to the macrocell, the first femto base station selects a resource profile that is available in the second frequency allocation when the received information allows for such a selection, and otherwise selects a resource profile that is available in a first frequency allocation.

5. The network of claim 4, wherein when the first femto base station selects a resource profile that is available in the first frequency allocation, the first femto base station has options of either selecting a resource profile used by the second femto base station or selecting a different resource profile than the resource profile used by the second femto base station.

6. The network of claim 4, wherein when the first femto base station selects a resource profile in the second frequency allocation, the first femto base station performs synchronization with the second femto base station in the same frequency allocation.

7. The network of claim 1, wherein the pre-configured profiles include pre-configured sets of downlink and uplink subframes.

8. The network of claim 7, wherein a maximum number of femtocells adjacent to each other in the macrocell is:
(k−1)×j, if only one frequency allocation is available to the macrocell, or
(a−1)×(k×j), if more than one frequency allocation is available to the macrocell,
wherein k is a number of frequency reuse regions; j is a number of pre-configured profiles; and a is a number of frequency allocations available to the macrocell.

9. The network of claim 3, wherein:
the super frame header and an advanced preamble are periodically broadcasted by the macro base station or the first femto base station,
the super frame header is transmitted at the same frequency as the advanced preamble, and
during self-configuration, the first femto base station synchronizes with the macro base station using the advanced preamble and identifies available frequency allocations and resource profiles by decoding information through the super frame header.

10. The network of claim 1, wherein:
the macro base station is configured to receive a macro report including interference information from a macro user station served by the macro base station, and
the femto base station is configured to receive a femto report including interference information from a user station served by the first femto base station.

11. The network of claim 10, wherein when the macro report indicates that the macro user station experiences interference from the femtocell, the macro base station assigns a resource profile to the macro user station such that interference from the femtocell is reduced.

12. The network of claim 11, wherein:
the macro base station assigns frequency reuse 1 to the macro user station when
the macro user station is located in a non-cell-edge area that is close to the center of the macrocell, or
the macro report indicates that the macro user station experiences no interference; and
the macro base station assigns frequency reuse n, where n>1, to the macro user station when
the macro user station is located in a cell-edge area, or
the macro report indicates that the macro user station experiences interference.

13. The network of claim 10, wherein the femtocell is a first femtocell and the femto base station is a first femto base station, the network further comprising:
a second femto base station in a second femtocell,
wherein when the femto report indicates that the first user station experiences interference from the second femtocell, the first femto base station adapts its configuration in accordance with the femto report in order to reduce interference.

14. A communication method within a communications network, comprising:
providing service to a macrocell from a macro base station;
receiving service in a femtocell including a femto base station;
broadcasting resource profiles from the macro base station in a super frame header; and
performing self-configuration in the femto base station using the resource profiles,
wherein:
the femtocell overlies the macrocell,
the resource profiles indicate sets of downlink and uplink subframes, and
the resource profiles include pre-configured profiles and frequency reuse information.

15. The method of claim 14, further comprising obtaining resource profiles from the macro base station through a backhaul.

16. The method of claim 14, wherein the femtocell is a first femtocell and the femto base station is a first femto base station, the network further comprising:
receiving service in a second femtocell including a second femto base station;
transmitting information from the macro base station and the second femto base station to the first femto base station during self-configuration; and
selecting a resource profile by the first femto base station such that its interference with both the macro base station and the second femto base station is reduced.

17. The method of claim 16, further comprising:
using a second frequency allocation by the second femto base station;
selecting a resource profile that is available in the second frequency allocation during self-configuration when the second frequency allocation is the only frequency allocation available to the macrocell;
selecting a resource profile that is available in the second frequency allocation when more than one frequency allocation is available to the macrocell and when the received information allows for such a selection; and
selecting a resource profile that is available in a first frequency allocation when more than one frequency allocation is available to the macrocell and when the received information does not allow for selecting a resource profile in the second frequency allocation.

18. The method of claim 17, wherein when the first femto base station selects a resource profile that is available in the first frequency allocation, the first femto base station has options of either selecting a resource profile used by the second femto base station or selecting a different resource profile than the resource profile used by the second femto base station.

19. The method of claim 17, wherein when the first femto base station selects a resource profile in the second frequency allocation, the first femto base station performs synchronization with the second femto base station in the same frequency allocation.

20. The method of claim 14, wherein the pre-configured profiles include pre-configured sets of downlink and uplink subframes.

21. The method of claim 20, further comprising setting a maximum number of femtocells adjacent to each other in the macrocell to be:
(k−1)×j, if only one frequency allocation is available to the macrocell, or
(a−1)×(k×j), if more than one frequency allocation is available to the macrocell,
wherein k is a number of frequency reuse regions; j is a number of pre-configured profiles; and a is a number of frequency allocations available to the macrocell.

22. The method of claim 16, further comprising:
periodically broadcasting the super frame header and an advanced preamble, transmitting the super frame header at the same frequency as the advanced preamble, and synchronizing the first femto base station, during self-configuration, with the macro base station using the advanced preamble and identifying available frequency allocations and resource profiles by decoding information through the super frame header.

23. The method of claim 14, further comprising:

transmitting a macro report including interference information from a macro user station served by the macro base station to the macro base station, and transmitting a femto report including interference information from a user station served by the femto base station to the femto base station.

24. The method of claim 23, further comprising assigning a resource profile to the macro user station such that interference from the femtocell is reduced upon an indication that the macro user station experiences interference from the femtocell.

25. The method of claim 24, further comprising:

assigning frequency reuse 1 to the macro user station when the macro user station is located in a non-cell-edge area that is close to the center of the macrocell, or the macro report indicates that the macro user station experiences no interference; and assigning frequency reuse n, where n>1, to the macro user station when the macro user station is located in a cell-edge area, or the macro report indicates that the macro user station experiences interference.

26. The method of claim 23, wherein the femtocell is a first femtocell and the femto base station is a first femto base station, the network further comprising:

receiving service in a second femtocell including a second femto base station; and adapting the configuration of the first femto base station in accordance with the femto report in order to reduce interference upon an indication that the first user station experiences interference from the second femtocell.

27. A method of operating a femtocell within an existing communications network, the method comprising:

receiving resource profiles broadcasted from a macro base station in a super frame header, the resource profiles indicating sets of downlink and uplink subframes, and including pre-configured profiles and frequency reuse information; and performing self-configuration using the received resource profiles.

28. A femto base station, comprising:

a processor configured to receive resource profiles from a network, wherein the resource profiles are broadcasted from a macro base station in a super frame header, the resource profiles indicate sets of downlink and uplink subframes and include pre-configured profiles and frequency reuse information; and wherein the processor is configured to perform self-configuration using the resource profiles.

29. A macro base station, comprising:

a processor configured to receive a macro report from a macro user station, the processor being configured to assign a resource profile to the macro user station such that interference from a nearby femtocell is reduced when the macro report indicates that the macro user station experiences interference from the nearby femtocell, wherein the macro base station broadcasts the resource profile in a super frame header, and the resource profile indicates a set of downlink and uplink subframes and includes a pre-configured profile and frequency reuse information.

* * * * *